United States Patent
Sung

(10) Patent No.: US 7,801,232 B2
(45) Date of Patent: Sep. 21, 2010

(54) CHANNEL ESTIMATION METHOD AND APPARATUS IN AN ORTHOGONAL FREQUENCY DIVISION MULTIPLEXING (OFDM) WIRELESS COMMUNICATION SYSTEM

(75) Inventor: Joon-Hyun Sung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 447 days.

(21) Appl. No.: 11/863,404

(22) Filed: Sep. 28, 2007

(65) Prior Publication Data

US 2008/0080630 A1    Apr. 3, 2008

(30) Foreign Application Priority Data

Sep. 29, 2006    (KR)    ............... 10-2006-0095761

(51) Int. Cl.
  *H04K 1/10*    (2006.01)
(52) U.S. Cl. ........................................... 375/260
(58) Field of Classification Search ............... 375/260
  See application file for complete search history.

(56) References Cited

U.S. PATENT DOCUMENTS

| | | | |
|---|---|---|---|
| 6,327,314 | B1 | 12/2001 | Cimini, Jr. et al. |
| 7,430,243 | B2 * | 9/2008 | Giannakis et al. ............ 375/267 |
| 7,639,600 | B1 * | 12/2009 | Lou et al. .................... 370/208 |
| 2005/0286406 | A1 * | 12/2005 | Jeon et al. .................... 370/208 |
| 2006/0056526 | A1 * | 3/2006 | Jain ............................ 375/260 |
| 2007/0297529 | A1 * | 12/2007 | Zhou et al. ................... 375/267 |
| 2009/0129499 | A1 * | 5/2009 | Kwak et al. ................. 375/267 |
| 2009/0310656 | A1 * | 12/2009 | Maltsev et al. ............... 375/219 |

FOREIGN PATENT DOCUMENTS

| | | |
|---|---|---|
| KR | 1020050066479 A | 6/2005 |
| KR | 1020060008574 A | 1/2006 |

OTHER PUBLICATIONS

Lei, "Low-Complexity Detection Exploiting Subcarrier Correlation in Multi-Layer STBC OFDM," Personal, Indoor and Mobile Radio Communications, 2006 IEEE 17th International Symposium on Sep. 11-14, 2006 pp. 1-6.*
Yang, "A low complexity VBLAST OFDM detection algorithm," Acoustics, Speech, and Signal Processing, 2004, Proceedings. (ICASSP '04). IEEE International Conference on vol. 4, May 17-21, 2004 pp. iv-801-4 vol. 4.*

(Continued)

*Primary Examiner*—Juan A Torres
(74) *Attorney, Agent, or Firm*—Sughrue Mion, PLLC

(57) ABSTRACT

A method and apparatus for performing channel estimation in an Orthogonal Frequency Division Multiplexing (OFDM) wireless communication system. The method and apparatus includes receiving a training sequence at each of a plurality of predetermined subcarriers; performing primary channel estimation on each of the training sequences by a Least Square (LS) algorithm; grouping the subcarriers into a predetermined number of subgroups, and acquiring a linear filter coefficient for each of the subgroups based on a channel estimate acquired for each of the subcarriers by the primary channel estimation; and performing secondary channel estimation on each of the subcarriers by performing a Minimum Mean-Square Error (MMSE) algorithm based on the linear filter coefficient of each subgroup.

12 Claims, 8 Drawing Sheets

OTHER PUBLICATIONS

Ye (Geoffrey) Li, "Simplified Channel Estimation for OFDM Systems With Multiple Transmit Antennas," IEEE Transactions on Wireless Communications, vol. 1, No. 1, pp. 67-75, Jan. 2002.*

Akhtman, "Generic reduced-complexity MMSE channel estimation for OFDM and MC-CDMA," 2005 IEEE 61st Vehicular Technology Conference, 2005, VTC 2005-Spring vol. 1, May 30-Jun. 1, 2005 pp. 528-532 vol. 1.*

Wang, "Modified Channel Estimation Algoriithms for OFDM Systems with Reduced Complexity." Signal Processing, ICSP '04, 2004 7th International Conference, vol. 2, panes 1747-1751.*

Chen, "Channel estimation for space time coded OFDM systems in non-sample-spaced multipath channels", 2002 IEEE Wireless Communications and Networking Conference, 2002, WCNC2002, vol. 1, Mar. 17-21, 2002 pp. 61-66 vol. 1.*

Jia-Ming, "A new channel estimation model in OFDM system based on improved pilot training sequence", ICMMT 4th International Conference on Microwave and Millimeter Wave Technology, 2004, Proceedings Aug. 18-21, 2004 pp. 846-849.*

Yuan, "Channel estimation for OFDM system with fast fading channels", 2004 International Conference on Communications, Circuits and Systems, 2004, ICCCAS 2004, vol. 1, Jun. 27-29, 2004 pp. 295-298 vol. 1.*

Sand, "Iterative channel estimation for MC-CDMA," 2005 IEEE 61st Vehicular Technology Conference, 2005, VTC 2005-Spring,vol. 1, May 30-Jun. 1, 2005 pp. 471-475 vol. 1.*

Wu, "Deterministic OFDM Channel Estimator Based on Nonmaximally Decimated Filterbanks," International Conference on Wireless Communications, Networking and Mobile Computing, 2006, WiCOM 2006, Sep. 22-24, 2006 pp. 1-4.*

Shen, "Analysis of pilot-assisted channel estimators for OFDM systems with transmit diversity," IEEE Transactions on Broadcasting, vol. 52, issue 2, Jun. 2006 pp. 193-202.*

Edfors, "OFDM channel estimation by singular value decomposition," IEEE Transactions on Communications, vol. 46, Issue 7, Jul. 1998 pp. 931-939.*

Lei, "Comparison Study of Low-Complexity Detection Schemes Exploiting Subcarrier Correlation for V-BLAST OFDM," Wireless Communications, Networking and Mobile Computing, 2006. WiCOM 2006.International Conference on Sep. 22-24, 2006 pp. 1-5.*

Lei, "Performance Comparison of Low-Complexity Detection Schemes for V-BLAST Coded MIMO-OFDM," Wireless Communication Systems, 2006. ISWCS '06. 3rd International Symposium on, Sep. 6-8, 2006 pp. 739-743.*

Kashima, "Adaptive MAP receiver via the EM algorithm and message passings for MIMO-OFDM mobile communications," Selected Areas in Communications, IEEE Journal on vol. 24, Issue 3, Mar. 2006 pp. 437-447.*

Hou, "Two-dimensional recursive least square adaptive channel estimation for OFDM systems," Wireless Communications, Networking and Mobile Computing, 2005. Proceedings. 2005 International Conference on vol. 1, Sep. 23-26, 2005 pp. 232-236.*

Nallanathan, "Adaptive channel estimation and interference cancellation in space-time coded OFDM systems," Vehicular Technology Conference, 2004. VTC 2004-Spring. 2004 IEEE 59th vol. 3, May 17-19, 2004 pp. 1760-1764 vol. 3.*

Kashima, "iterative-MAP adaptive detection via the EM algorithm for LDPC-coded MIMO-OFDM mobile communications in fast fading channels," Vehicular Technology Conference, 2005. VTC 2005-Spring. 2005 IEEE 61st vol. 3, May 30-Jun. 1, 2005 pp. 1681-1685 vol. 3.*

Yang, "A joint channel estimation scheme with MMSE and FRLS for wireless MIMO-OFDM," Emerging Technologies: Frontiers of Mobile and Wireless Communication, 2004. Proceedings of the IEEE 6th Circuits and Systems Symposium on vol. 2, May 31-Jun. 2, 2004 pp. 623-626 vol. 2.*

Van de Beek et al., "On Channel Estimation in OFDM Systems," Proc. of the Vehicular Technology Conf., Chicago, USA, vol. 2, pp. 815-819, Jul. 1995.*

Zhu J. et al., "A Low Complexity Channel Estimator for OFDM Systems in Multipath Fading Channels", Personal, Indoor and Mobile Radio Communications, 2004, pp. 1978-1982, vol. 3, IEEE.

* cited by examiner

CHANNEL ESTIMATION METHOD AND APPARATUS IN AN ORTHOGONAL FREQUENCY DIVISION MULTIPLEXING (OFDM) WIRELESS COMMUNICATION SYSTEM

PRIORITY

This application claims priority from Korean Patent Application No. 10-2006-95761 filed on Sep. 29, 2006 in the Korean Intellectual Property Office, the entire disclosure of which is incorporated herein by reference.

BACKGROUND OF THE INVENTION

1. Field of the Invention

The present invention relates generally to a channel estimation method and apparatus in an Orthogonal Frequency Division Multiplexing (OFDM) wireless communication system, and in particular, to a method and apparatus for realizing a channel estimation algorithm based on a block-type training sequence.

2. Description of the Related Art

Generally, channel estimation is achieved based on a training sequence. The training sequence has a block-type structure. Such a training sequence is equal in structure to the training sequence proposed in the IEEE 802.11 standard.

There is a Least-Square (LS) algorithm as a simple channel estimation algorithm. Actually, the LS algorithm is very popularly used. A Minimum Mean-Square Error (MMSE) algorithm is a channel estimation algorithm advanced from the LS algorithm in terms of the performance. However, the MMSE algorithm is higher in complexity than the LS algorithm.

The two channel estimation algorithms have the following characteristics.

LS algorithm: This algorithm is very low in the complexity, but has poor Packet Error Rate (PER) performance at a low Signal-to-Noise Ratio (SNR).

MMSE algorithm: This algorithm is very high in the complexity, but has good PER performance at a low SNR.

As described above, in the channel estimation algorithms, there is a trade-off relationship between the complexity and the performance. That is, the reduction in the complexity causes the decrease in the performance, and the increase in the performance causes the increase in the complexity.

Therefore, constant research is being conducted on a channel estimation algorithm capable of providing good performance with the low complexity, but it is very hard to realize the algorithm.

SUMMARY OF THE INVENTION

An aspect of the present invention is to address at least the problems and/or disadvantages and to provide at least the advantages described below. Accordingly, an aspect of the present invention is to provide a method and apparatus for realizing a channel estimation algorithm capable of obtaining good performance with the low complexity.

Another aspect of the present invention is to provide a channel estimation algorithm method and apparatus for reducing the complexity due to channel estimation in an OFDM wireless communication system using a block-type training sequence.

Another aspect of the present invention is to provide a channel estimation method and apparatus for ensuring the complexity of the LS algorithm and the performance of the MMSE algorithm in an OFDM wireless communication system using a block-type training sequence.

Another aspect of the present invention is to provide a channel estimation method and apparatus for realizing a Split-MMSE algorithm capable of acquiring the approximate performance of the MMSE algorithm with the low complexity.

According to one aspect of the present invention, there is provided a method for performing channel estimation in an Orthogonal Frequency Division Multiplexing (OFDM) wireless communication system. The method includes receiving a training sequence at each of a plurality of predetermined subcarriers; performing primary channel estimation on each of the training sequences by a Least Square (LS) algorithm; grouping the subcarriers into a predetermined number of subgroups, and acquiring a linear filter coefficient for each of the subgroups based on a channel estimate acquired for each of the subcarriers by the primary channel estimation; and performing secondary channel estimation on each of the subcarriers by performing a Minimum Mean-Square Error (MMSE) algorithm based on the linear filter coefficient of each subgroup.

According to another aspect of the present invention, there is provided an apparatus for performing channel estimation in an Orthogonal Frequency Division Multiplexing (OFDM) wireless communication system. The apparatus includes a Least Square (LS) channel estimator for performing primary channel estimation by zero-forcing a training sequence received at each of a plurality of predetermined subcarriers; a correlation matrix estimator for grouping the subcarriers into a predetermined number of subgroups, and estimating a correlation matrix corresponding to each subgroup based on a channel estimate acquired for each of the subcarriers by the primary channel estimation; a filter calculator for calculating a linear filter coefficient based on the estimated correlation matrix and a previously known noise variance; and a Minimum Mean-Square Error (MMSE) channel estimator for performing secondary channel estimation on each of the subcarriers by performing on each of the subgroup an MMSE algorithm to which the calculated linear filter coefficient is applied.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF PREFERRED EMBODIMENTS

Figure 1:
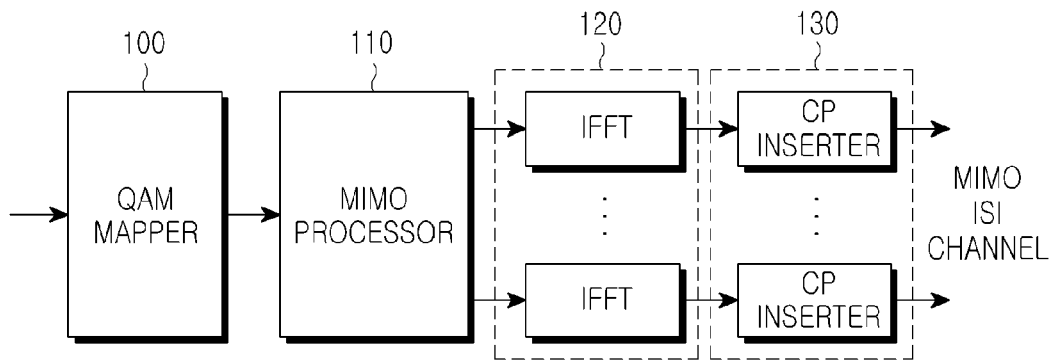
FIG. 1 illustrates a structure of a transmission apparatus supporting OFDM.

Preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for clarity and conciseness.

According to an embodiment of the present invention, a transmitter transmits a training sequence for channel estimation. The training sequence is transmitted at each subcarrier in a predetermined subcarrier band. Alternatively, the training sequence can be transmitted in a predetermined subcarrier band at stated periods. A set of subcarriers transmitted at each subcarrier in the predetermined subcarrier band is referred to as a 'block-type training sequence'.

Meanwhile, according to an embodiment of the present invention, a receiver receives a training sequence at each subcarrier in a predetermined subcarrier band, and performs a Least Square (LS) algorithm for estimating a channel through Zero Forcing (ZF) for each training sequence.

The receiver acquires a channel estimate corresponding to the training sequence at each subcarrier by LS algorithm. The receiver calculates a linear filter coefficient for each individual subgroup based on the acquired channel estimate. The subgroup is a bundle of subcarriers, obtained by grouping into a predetermined number S of groups the subcarriers at which a training sequence is received.

Thereafter, the receiver performs an MMSE algorithm based on the linear filter coefficient calculated depending on each subgroup. The receiver acquires a channel estimate associated with each subcarrier at which the training sequence is received, by performing the MMSE algorithm.

FIG. 1 illustrates a structure of a transmission apparatus supporting OFDM. The transmission apparatus shown in FIG. 1 includes a Quadrature Amplitude Modulation (QAM) mapper 100, a Multiple-Input Multiple-Output (MIMO) processor 110, an Inverse Fast Fourier Transform (IFFT) block 120, and a Cyclic Prefix (CP) insertion block 130.

Referring to FIG. 1, a desired transmission bit stream is provided to the QAM mapper 100. The bit stream includes not only the data stream but also the training sequence predefined for channel estimation.

The QAM mapper 100 modulates the bit stream by a predetermined modulation scheme to generate a QAM symbol stream. The MIMO processor 110 is a structure required for transmitting data via a plurality of antennas in a transmission apparatus of a multi-antenna system. The MIMO processor 110 receives the QAM symbol stream, and distributes QAM symbols separately to each individual antenna by Space-Time Coding (STC) or Spatial Multiplexing (SM) for the QAM symbol stream. For a single-antenna system, the MIMO processor 110 simply outputs null blocks as the remaining outputs except for the output to the antenna via which it will transmit the QAM symbol stream.

The QAM symbol stream being output via each individual antenna is buffered together with a guard band and DC subcarriers until its size reaches the FFT size. The DC subcarrier means a subcarrier having the same frequency as the Radio Frequency (RF) center frequency of a base station or a terminal.

The symbol stream being output to each individual antenna, FFT-sized by the buffering, is provided to the IFFT block 120. The IFFT block 120 performs IFFT on the symbol stream to output a time-domain signal. The CP insertion block 130 adds a CP to a front end of the time-domain signal provided for each individual antenna. The CP-added signal is transmitted to a reception apparatus over multiple channels formed by multiple antennas.

As described above, the transmission apparatus generates a spatial stream for multiple antennas using a QAM signal, performs IFFT on each of the spatial streams, and then adds a CP before transmitting them via multiple antennas.

Figure 2:
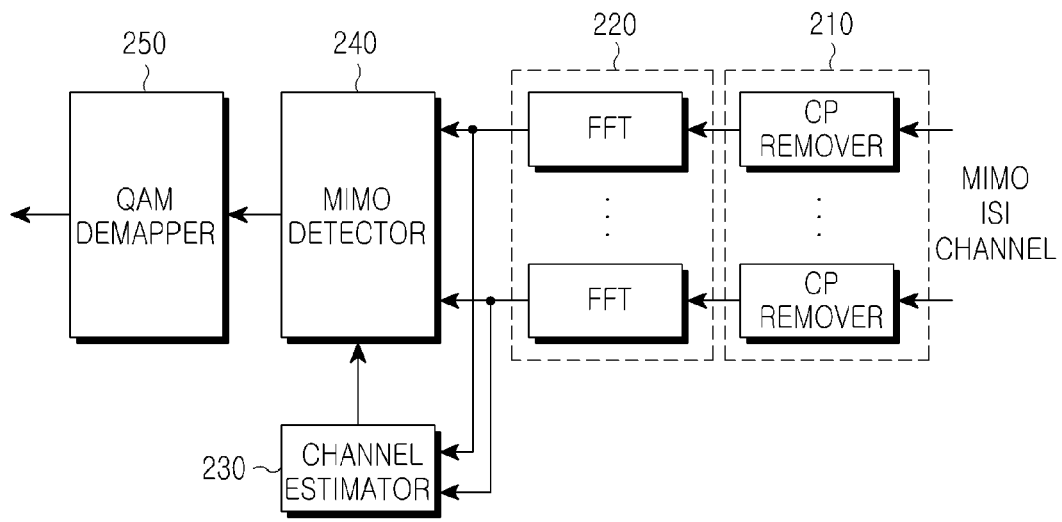
FIG. 2 illustrates a structure of a reception apparatus supporting OFDM.

FIG. 2 illustrates a structure of a reception apparatus supporting OFDM. The reception apparatus shown in FIG. 2 includes a CP removing block 210, a Fast Fourier Transform (FFT) block 220, a channel estimator 230, a MIMO detector 240, and a QAM demapper 250.

Referring to FIG. 2, a signal transmitted from a transmission apparatus over multiple channels is provided to the CP removing block 210. The received signal provided to the CP removing block 210 first undergoes time/frequency synchronization. The CP removing block 210 removes a CP from the time/frequency synchronized signal. The CP-removed received signal is buffered until its size reaches the FFT size.

The received signal FFT-sized by the buffering is provided to the FFT block 220. The FFT block 220 performs FFT on the FFT-sized received signal to output a frequency-domain signal.

The frequency-domain signal is provided to the channel estimator 230 and the MIMO detector 240. The channel estimator 230 estimates a channel status for each of channels formed by multiple antennas, and outputs a channel estimate associated with each of the channels.

Generally, in the Single-Input Single-Output (SISO) OFDM system, various channel estimation algorithms have been proposed. Of the proposed channel estimation algorithms, the LS algorithm attracts the greatest attention due to its simplicity. The LS algorithm achieves channel estimation by performing Zero Forcing on the training sequence received at each subcarrier. As described above, however, the LS algorithm has poor PER performance.

Therefore, the present invention proposes a Split-MMSE algorithm as a preferable channel estimation algorithm. The Split-MMSE algorithm, to perform the MMSE algorithm, uses a channel estimation result value obtained by primarily performing the LS algorithm. The Split-MMSE algorithm primarily performs channel estimation based on the LS algorithm, and secondarily performs channel estimation based on the MMSE algorithm. The Split-MMSE algorithm can improve the channel estimation performance with the reduced complexity. A detailed description of the Split-MMSE algorithm will be made hereinbelow.

The MIMO detector 240 generates a QAM signal depending on a time-domain signal provided from the FFT block 220 for each individual antenna, and a channel estimate provided from the channel estimator 230 for each individual channel. The QAM signal is provided to the QAM demapper 250. For the single-antenna system, the MIMO detector 240 can be simply realized with a frequency-domain one-tap equalizer. The QAM demapper 250 outputs the original signal (or source signal) by demapping the QAM signal to bits. The original signal corresponds to the bit stream transmitted by the transmission apparatus.

As described above, the reception apparatus removes a CP from each received stream, and performs FFT on each of the CP-removed received streams. The FFT-processed signal is free from Inter-Symbol Interference (ISI). The spatial interference caused by the multiple antennas can be cancelled or reduced by MIMO detection.

Figure 3:
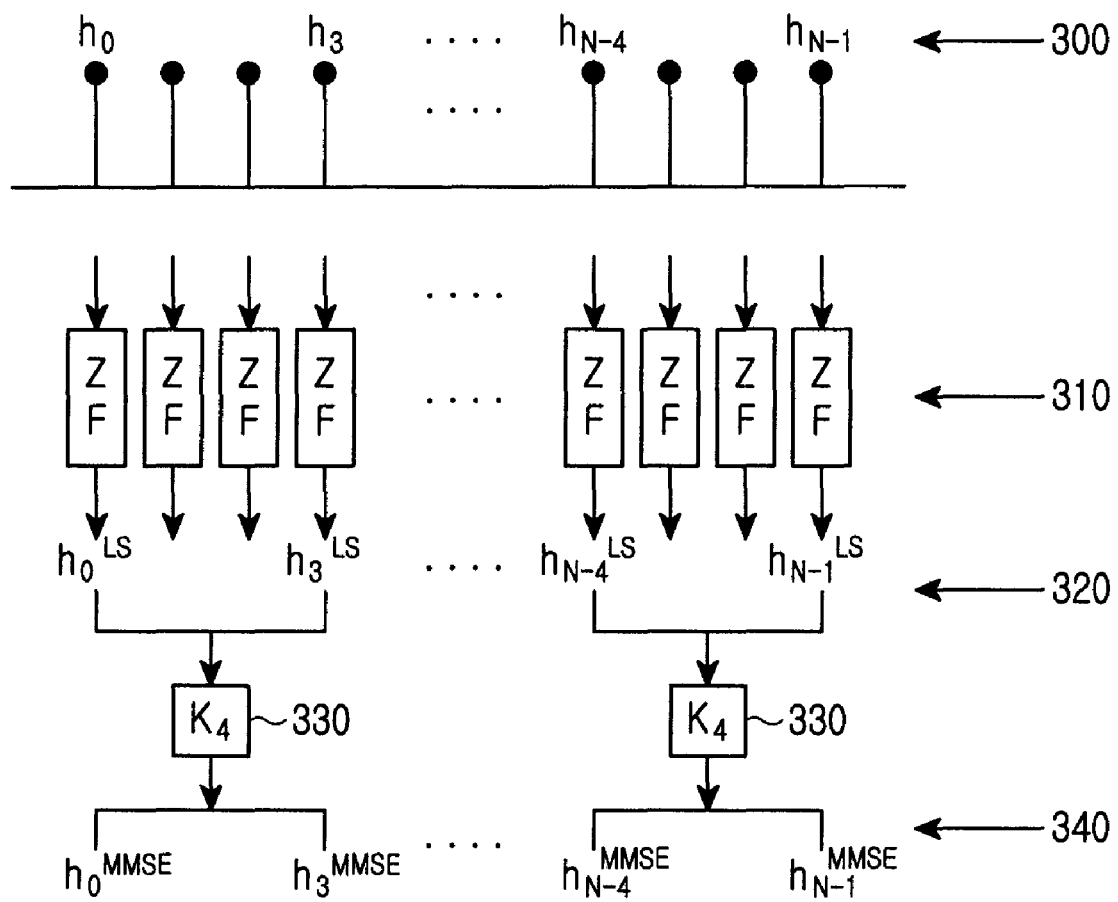
FIG. 3 schematically illustrates a channel estimation procedure based on a Split-MMSE algorithm proposed as a preferred embodiment of the present invention.

FIG. 3 schematically illustrates a channel estimation procedure based on a Split-MMSE algorithm proposed as a preferred embodiment of the present invention. It is assumed in FIG. 3 that training sequences are received over N subcarriers and each subgroup is a bundle of 4 subcarriers.

Referring to FIG. 3, the Split-MMSE algorithm performs ZF on each of training sequences received separately over associated subcarriers $h_0, h_1, h_2, \ldots, h_{N-1}$, to acquire LS algorithm-based channel estimates $h_n^{LS}$ (where $0 \leq n \leq N-1$, and N denotes the number of subcarriers used for transmitting the training sequences) (see reference numerals 300, 310 and 320). The channel estimates $h_n^{LS}$ acquired by the LS algorithm are independent of the signal received at each subcarrier.

The Split-MMSE algorithm calculates a linear filter coefficient K depending on the acquired channel estimates $h_n^{LS}$. The linear filter coefficient K associated with each subcarrier can be calculated by $$K = R_{hh}(R_{hh} + N_0 I)^{-1} \quad (1)$$

where $R_{hh}$ denotes a correlation matrix of a channel h, $N_0$ denotes a noise variance, and I denotes an identity matrix.

To calculate the linear filter coefficient K using Equation (1), the Split-MMSE algorithm requires information on the correlation matrix $R_{hh}$ and the noise variance $N_0$. When calculating the linear filter coefficient K in this way, the Split-MMSE algorithm can improve accuracy of the channel estimation. In this case, however, because the dimension of $R_{hh}$ is very large, the Split-MMSE algorithm has a very high complexity due to the inversion of the matrix. For example, for size-64 FFT, the number of subcarriers to be used is 52. Therefore, to calculate the linear filter coefficient K, there is a need for inversion of a 52×52 matrix.

From the foregoing, it can be expected that the complexity can noticeably reduced by reducing the size of the correlation matrix $R_{hh}$. Therefore, the present invention proposes to divide all subcarriers into subgroups having a predetermined size S rather than to apply an MMSE filter for all subcarriers, and to calculate a linear filter coefficient (for example $K_4$ 330 330) for each individual subgroup. That is, the present invention calculates a linear filter coefficient $K_S$ of each subgroup using Equation (2).

$$K_S = R_{hh,S}(R_{hh,S} + N_0 I_S)^{-1} \quad (2)$$

where $R_{hh,S}$ denotes a correlation matrix of a channel h in a size-S subgroup, $N_0$ denotes a noise variance, and $I_S$ denotes an identity matrix.

The linear filter coefficient $K_S$ calculated by Equation (2) is applied separately to each individual subgroup. That is, for the calculation of the linear filter coefficient $K_S$ by Equation (2), there is a need only for inversion of an S×S matrix. Therefore, the complexity can be noticeably reduced, compared to the case where the linear filter coefficient is calculated by Equation (1). For example, when S=4, the matrix dimension is reduced from '52×52' to '4×4'. The linear filter coefficient $K_S$ calculated for each individual subgroup is equal, and is applied for channel estimation based on the LS algorithm to generate a channel estimate based on the MMSE algorithm.

However, if the S is reduced considering only the complexity, it may cause a decrease in the performance. Therefore, it is necessary to determine the S taking both the complexity and the performance into a full consideration. It is determined that to set the S to 4, as presented before by way of example, is a good choice that considers both the complexity and the performance. This will be clearly shown in the following description of the simulation data.

To calculate the linear filter coefficient $K_S$ by Equation (2), there are matters that should be additionally considered. That is, to calculate the linear filter coefficient K for application of the full MMSE algorithm by Equation (1), and the linear filter coefficient $K_S$ for application of the Split-MMSE algorithm by Equation (2), the noise variance $N_0$ and the correlation matrix $R_{hh}$ should be known.

Therefore, when the reception apparatus is assumed to have information on the noise variance $N_0$, the invention focuses on calculation of the correlation matrix $R_{hh}$. For example, for S=4, the correlation matrix $R_{hh,S}$ has the following structure defined by Equation (3).

$$R_{hh,4} = \begin{bmatrix} \rho_0 & \rho_1 & \rho_2 & \rho_3 \\ \rho_1^* & \rho_0 & \rho_1 & \rho_2 \\ \rho_2^* & \rho_1^* & \rho_0 & \rho_1 \\ \rho_3^* & \rho_2^* & \rho_1^* & \rho_0 \end{bmatrix} \quad (3)$$

As can be understood from Equation (3), it is possible to acquire the correlation matrix $R_{hh,S}$ by estimating only 4 correlation coefficients. The estimation of the correlation coefficients is achieved by Equation (4).

$$\rho_0 = \text{average}[h_k^{LS} h_k^{LS*}] - N_0$$

$$\rho_m = \text{average}[h_k^{LS} h_{k+m}^{LS*}] \quad (4)$$

Equation (4) finds an average of correlation coefficients for all subcarriers to reduce the noise effect at a low SNR. Further, even for the multi-antenna system, the invention considers an average of correlation coefficients for all antennas. The average can be calculated by Equation (4) according to statistics that remain unchanged for the packets for indoor use.

Finite-resolution computation could incur a singularity problem when calculating the $R_{hh,S}$ by Equation (2). To solve this problem, it is preferable to calculate the linear filter coefficient $K_S$ of each individual subgroup using Equation (5).

$$K_S = N_0^{-1} I_S - N_0^{-2} U(N_0^{-1} I + S^{-1})^{-1} U^* \quad (5)$$

where $R_{hh,S} = USU^*$ denotes eigendecomposition of $R_{hh,S}$, $R_{hh,S}$ denotes a correlation matrix of a channel h in a size-S subgroup, $N_0$ denotes a noise variance, and I and $I_S$ denote identity matrixes.

Equation (5), though it is mathematically identical to Equation (2), is more suitable for finite-precision computation.

The linear filter coefficient calculated for each individual subgroup is used for channel estimation based on the MMSE algorithm, performed over each subcarrier (see reference numeral 340). Further, the invention acquires the MMSE algorithm-based channel estimation result $h_n^{MMSE}$ (where $0 \leq n \leq N-1$ and, N denotes the number of subcarriers used for transmitting the training sequences).

Figure 4:
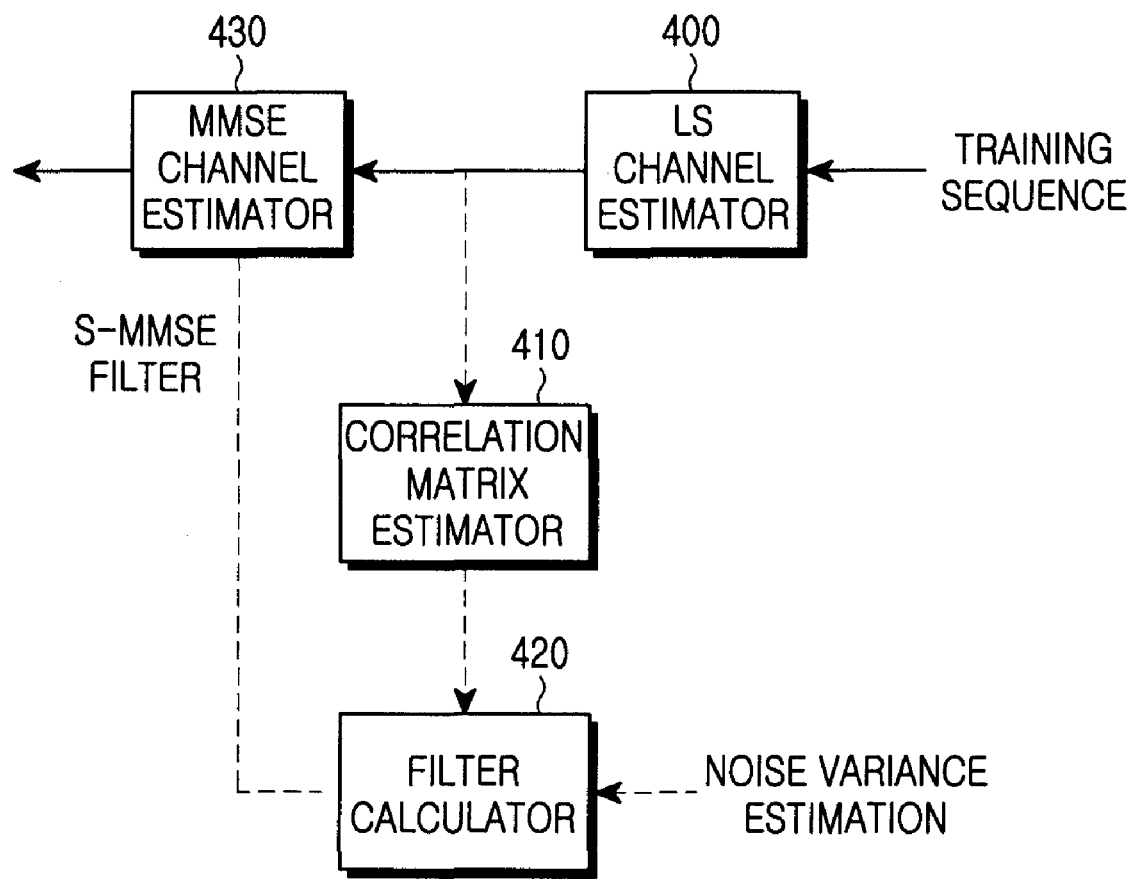
FIG. 4 illustrates an example of a channel estimator for performing channel estimation based on a channel estimation algorithm proposed in the present invention.

FIG. 4 illustrates an example of a channel estimator 230 for performing channel estimation based on a channel estimation algorithm proposed in the present invention. The channel estimator 230, as shown in FIG. 4, includes an LS channel estimator 400, a correlation matrix estimator 410, a filter calculator 420, and an MMSE channel estimator 430.

Referring to FIG. 4, a received training sequence is provided to the LS channel estimator 400 after it undergoes CP removing and is FFT-converted into a frequency-domain signal. The process of removing a CP from the training sequence and performing FFT thereon has been described with reference to FIG. 2.

The LS channel estimator 400 performs coarse LS algorithm-based estimation on the training sequence. That is, the LS channel estimator 400 acquires a primary channel estimate $h_n^{LS}$ through ZF channel estimation separately for each training sequence received by each subcarrier. The primary channel estimate $h_n^{LS}$ is provided to the MMSE channel estimator 430 and the correlation matrix estimator 410.

The correlation matrix estimator 410 estimates a correlation matrix based on the primary channel estimate $h_n^{LS}$. Averaging is performed over subcarriers. Further, averaging is performed over available reception antennas and OFDM symbols as well. The correlation matrix has the structure of Equation (3). To estimate the correlation matrix, the correlation matrix estimator 410 should first estimate a predetermined number of correlation coefficients. The correlation coefficients are estimated by Equation (4). In this case, the primary channel estimate $h_n^{LS}$ is used.

The correlation matrix estimated by the correlation matrix estimator 410 is provided to the filter calculator 420. The filter calculator 420 calculates a linear filter coefficient $K_S$ of each subgroup from the estimated correlation matrix using noise variance estimation. The linear filter coefficient $K_S$ of each subgroup is calculated by Equation (2) or Equation (5). The calculated linear filter coefficient $K_S$ of each subgroup is provided to the MMSE channel estimator 430.

The MMSE channel estimator 430 performs channel estimation considering the primary channel estimate $h_n^{LS}$ provided from the LS channel estimator 400 and the linear filter coefficient $K_S$ of each subgroup. That is, the MMSE channel estimator 430 performs the MMSE algorithm-based channel estimation by applying a corresponding linear filter coefficient to each group of subcarriers. The reception apparatus acquires the final channel estimate $h_n^{MMSE}$ for each subcarrier by the MMSE algorithm.

Figure 5:
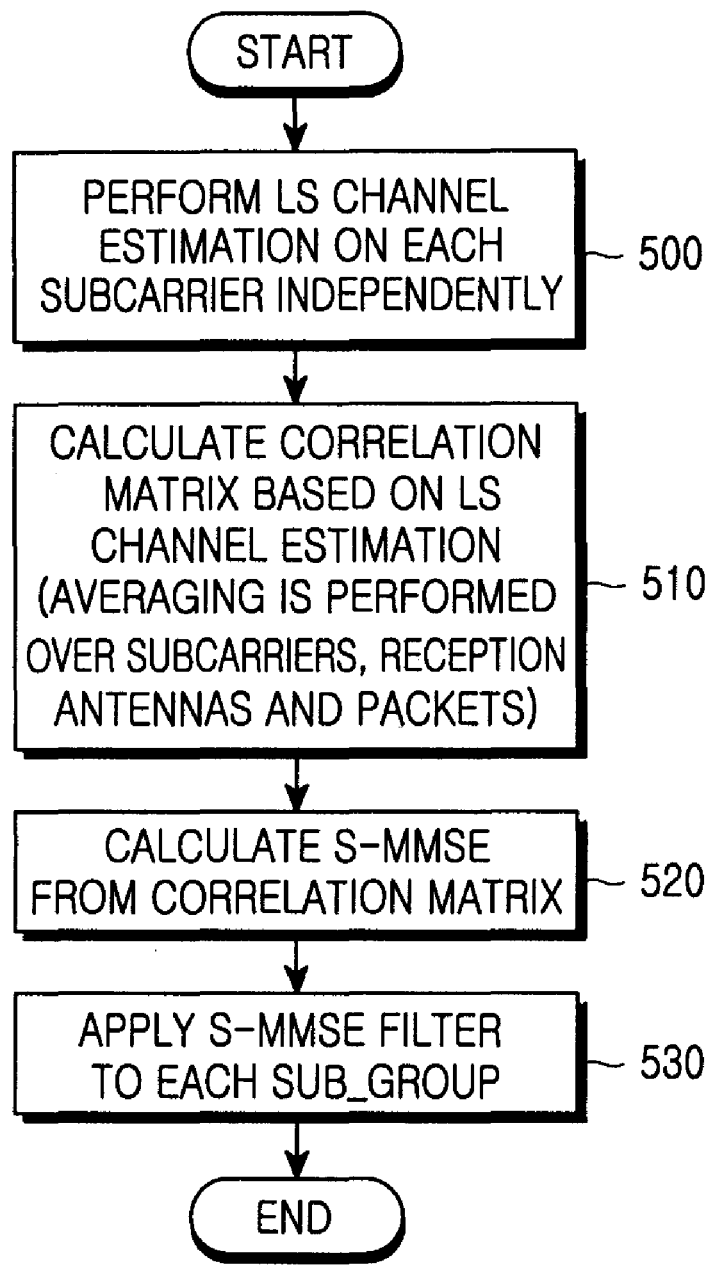
FIG. 5 illustrates a channel estimation procedure based on a channel estimation algorithm proposed in the present invention.

FIG. 5 illustrates a channel estimation procedure based on a channel estimation algorithm proposed in the present invention.

Referring to FIG. 5, in step 500, a channel estimator performs LS algorithm-based channel estimation on a training sequence received over each individual subcarrier. The LS algorithm-based channel estimation is achieved independently for each of the training sequences. That is, the channel estimator performs LS algorithm-based channel estimation on each subcarrier independently. Therefore, in step 500, the channel estimator acquires a primary channel estimate $h_n^{LS}$ of each individual training sequence.

In step 510, the channel estimator calculates a correlation matrix based on the primary channel estimate $h_n^{LS}$ estimated for each individual training sequence. Averaging is performed over subcarriers. Further, averaging is performed over available reception antennas and OFDM symbols as well. To estimate the correlation matrix, the channel estimator estimates a predetermined number of correlation coefficients using the primary channel estimate $h_n^{LS}$. The correlation coefficients are estimated by Equation (4).

In step 520, the channel estimator calculates a linear filter coefficient $K_S$ of each individual subgroup using the estimated correlation matrix. The linear filter coefficient $K_S$ of each individual subgroup is calculated by Equation (2) or Equation (5). In step 530, the channel estimator performs the MMSE algorithm-based channel estimation considering both the primary channel estimate $h_n^{LS}$ and the linear filter coefficient $K_S$ of each individual subgroup. In this manner, the channel estimator acquires the final channel estimate $h_n^{MMSE}$ of each individual subcarrier.

Figure 6:
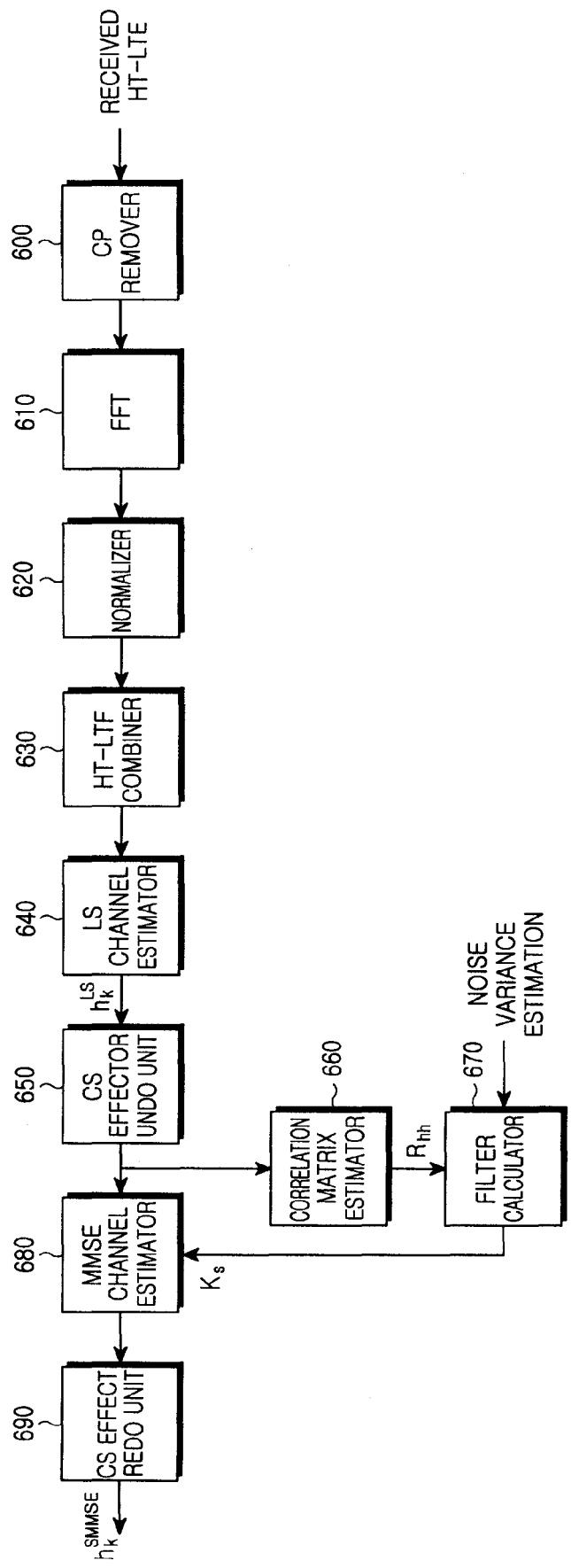
FIG. 6 illustrates an exemplary structure of a reception apparatus for performing a channel estimation algorithm proposed by the present invention in a wireless LAN communication system.

FIG. 6 illustrates an exemplary structure of a reception apparatus for performing a channel estimation algorithm proposed by the present invention in a wireless Local Area Network (LAN) communication system. The reception apparatus shown in FIG. 6 includes a CP remover 600, an FFT unit 610, a normalizer 620, a High-Throughput Long Training Field (HT-LTF) combiner 630, an LS channel estimator 640, a Cyclic Shift (CS) effect undo unit 650, a correlation matrix estimator 660, a filter calculator 670, an MMSE channel estimator 680, and a CS effect redo unit 690. Of the elements, the elements already described in FIGS. 2 and 3, or the elements well known in the wireless LAN communication system will now be described herein for simplicity. That is, a detailed description of the CP remover 600, the FFT unit 610, the normalizer 620, the LS channel estimator 640, the correlation matrix estimator 660, the filter calculator 670 and the MMSE channel estimator 680 in FIG. 6 will be omitted.

Referring to FIG. 6, a training sequence lies in a HT-LTF. When the multiple antennas are employed and Code Division Multiplexing (CDM)-multiplexed training sequences are in the HT-LTF, the received HT-LTF sequences should be combined by the HT-LTF combiner 630 before LS channel estimation. The LS channel estimator 640 performs LS algorithm-based channel estimation on the used subcarriers, while it skips the guard band and DC subcarriers.

In the wireless LAN communication network, CS is performed to avoid unintentional beamforming. This CS processing critically influences the frequency correlation, which hinders the use of MMSE algorithm-based channel estimation. To solve this problem, CS effects should be removed before MMSE algorithm-based channel estimation, and revived to bring back to original signals. Correlation matrix estimation is also performed after neutralizing CS effects. The block diagram for channel estimation and correlation matrix estimation in the reception apparatus of the wireless LAN communication system is illustrated in FIG. 6. In this drawing, CS effect removal and revival are performed in the CS effect undo unit 650 and the CS effect redo unit 690, respectively.

A description will now be made of the simulation results on Mean Squared Error (MSE) of the Split-MMSE algorithm with correlation matrix estimation proposed in the present invention. To this end, the invention considers a 2×2 MIMO OFDM system with 64 subcarriers, and sets the size of correlation matrix as S=4.

Figure 7:
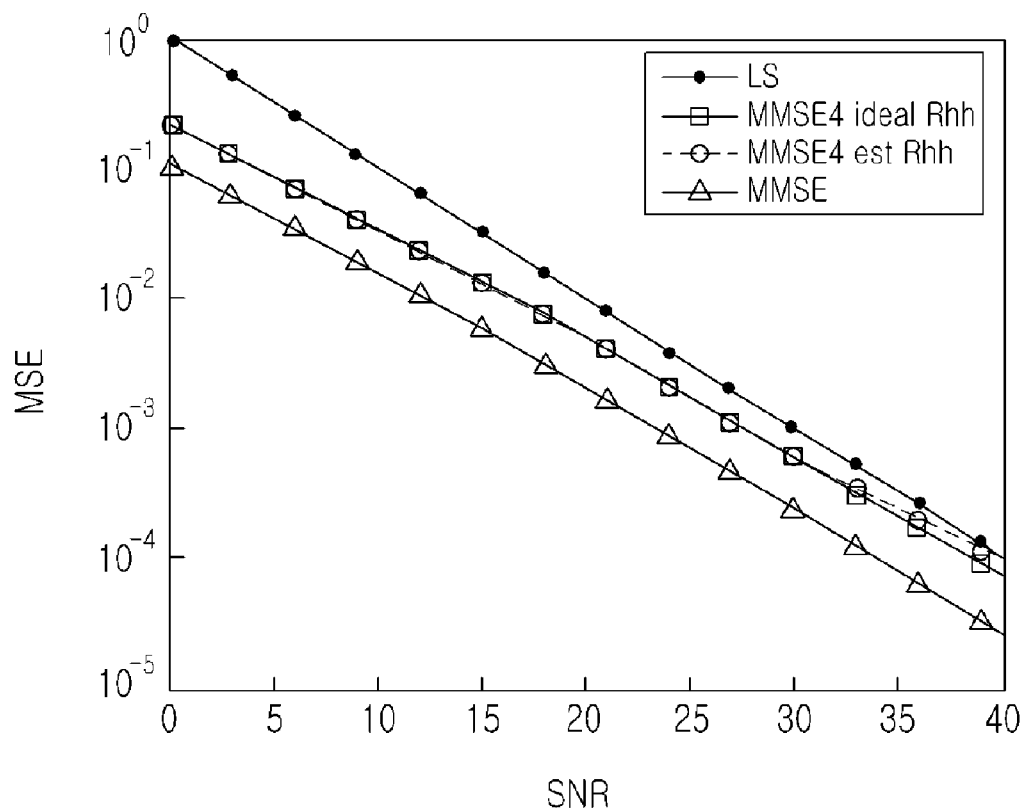
FIG. 7 illustrates performance of Split-MMSE estimation when a channel correlation is estimated along with the ideal correlation matrix according to an embodiment of the present invention.

FIG. 7 illustrates performance of Split-MMSE estimation when a channel correlation is estimated along with the ideal correlation matrix according to an embodiment of the present invention. For references, the MSE performance of LS and MMSE algorithms is also plotted.

Referring to FIG. 7, it is shown that the correlation matrix estimation is nearly perfect at a low SNR. There is a little degradation at a high SNR due to unstable matrix inverse calculation. Averaging is performed over subcarriers, antennas, and packets.

Figure 8:
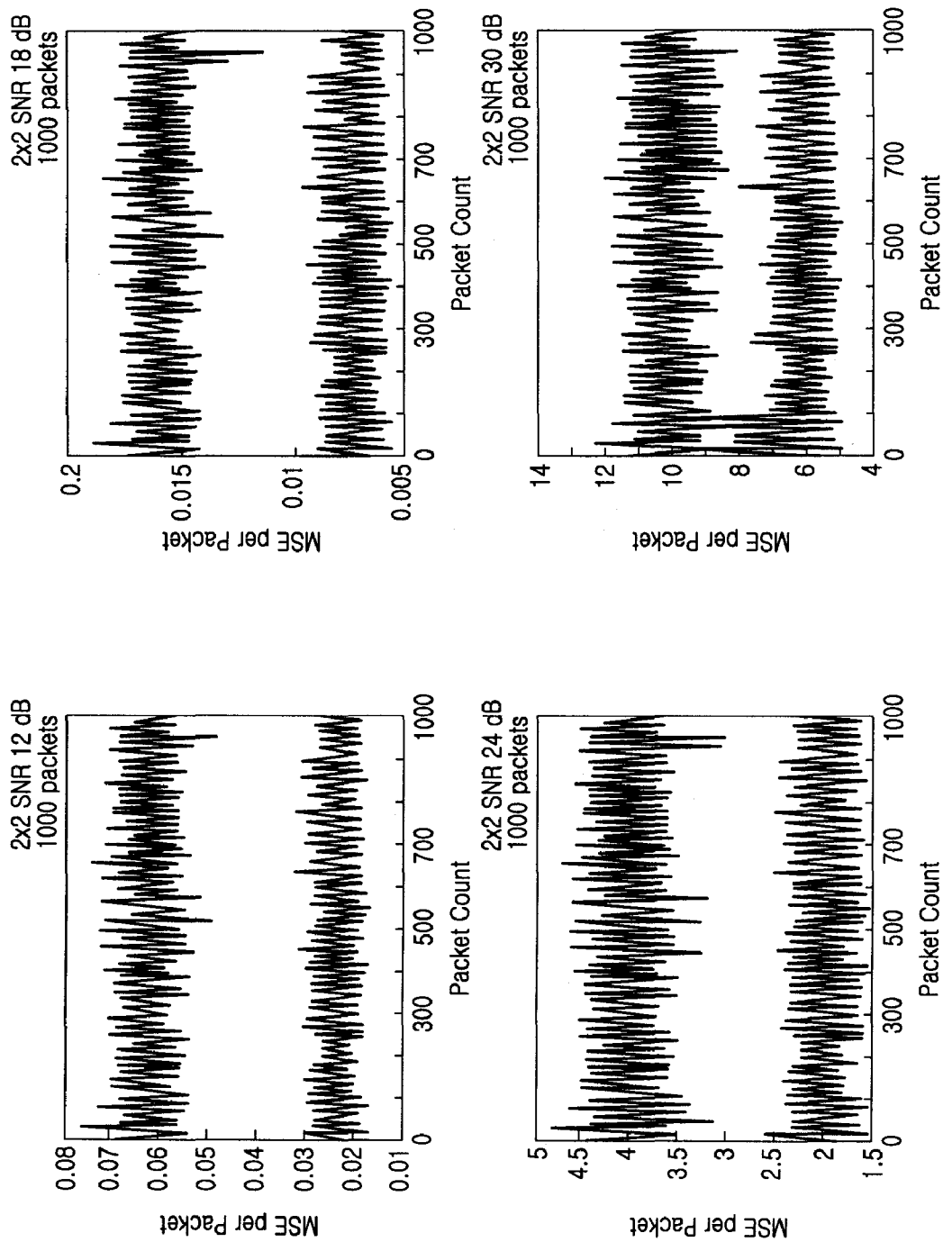
FIG. 8 illustrates the MSE as packets are generated, according to an embodiment of the present invention.

FIG. 8 illustrates the MSE as packets are generated, according to an embodiment of the present invention.

Referring to FIG. 8, at a low SNR, correlation matrix estimation is performed as done in the ideal case. In this case, packet averaging can be omitted. At the beginning, when SNR is 30 dB, there is a small degradation in estimation of the channel correlation matrix, which converges to the ideal case as time goes by.

Figure 9:
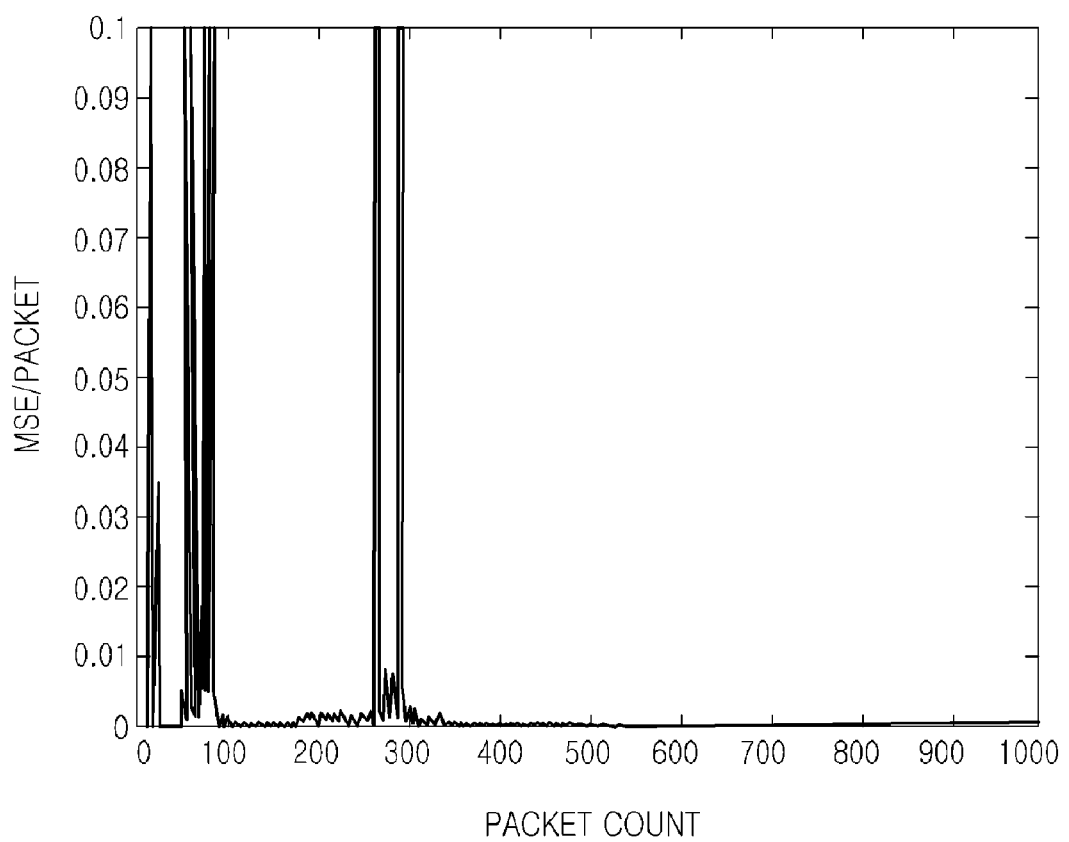
FIG. 9 shows that Equation (5) according to an embodiment of the present invention is much more stable than Equation (2).

FIG. 9 shows that Equation (5) according to an embodiment of the present invention is much more stable than Equation (2). In FIG. 9, due to the singularity, Equation (2) yields a significant MSE at the beginning, while Equation (54) maintains MSE at reasonable level.

As is apparent from the foregoing description, according to the present invention, the channel estimation can be performed in a split manner by the LS algorithm and the MMSE algorithm, thereby reducing the complexity compared to the case where only the MMSE algorithm is used. In addition, the present invention can obtain good performance compared to the case where the channel estimation is performed using only the LS algorithm. Further, the channel estimation algorithm proposed in the present invention can be applied to various communication schemes.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for performing channel estimation in an Orthogonal Frequency Division Multiplexing (OFDM) wireless communication system, the method comprising:
   receiving a training sequence at each of a plurality of predetermined subcarriers;
   performing primary channel estimation on each of the training sequences by a Least Square (LS) algorithm;
   grouping the subcarriers into a predetermined number of subgroups, and acquiring a linear filter coefficient for each of the subgroups based on a channel estimate acquired for each of the subcarriers by the primary channel estimation; and
   performing secondary channel estimation on each of the subcarriers by performing a Minimum Mean-Square Error (MMSE) algorithm based on the linear filter coefficient of each subgroup,
   wherein the linear filter coefficient acquired for each of the subgroups is calculated by using eigen-decomposition of a correlation matrix of a channel h in a corresponding subgroup.

2. The method of claim 1, wherein the acquiring of a linear filter coefficient comprises:
   estimating a plurality of correlation coefficients depending on the channel estimate acquired for each of the subcarriers by the primary channel estimation;
   acquiring a correlation matrix determined by considering a number of subcarriers constituting the subgroup depending on a plurality of the estimated correlation coefficients; and
   calculating the linear filter coefficient based on the acquired correlation matrix and a previously known noise variance.

3. The method of claim 2, wherein the linear filter coefficient $K_S$ is calculated by $N_0^{-1}I_S - N_0^{-2}U(N_0^{-1}I+S^{-1})^{-1}U^*$, where $R_{hh,S} = USU^*$ denotes the eigendecomposition of $R_{hh,S}$, and $R_{hh,S}$ denotes the correlation matrix of the channel h in a size-S subgroup, $N_0$ denotes a noise variance, and I and $I_S$ denote identity matrixes.

4. The method of claim 3, wherein the correlation coefficients are estimated by $\rho_0 = \text{average}[h_k^{LS} h_k^{LS*}] - N_0$ and $\rho_m = \text{average}[h_k^{LS} h_{k+m}^{LS*}]$, where $h_n^{LS} (0 \leq n \leq N-1)$ denotes a channel estimate acquired for each subcarrier, N denotes a number of subcarriers used for transmitting a training sequence, and $N_0$ denotes a noise variance.

5. The method of claim 4, wherein an average for estimation of the correlation coefficients is calculated over subcarriers, reception antennas and packets to reduce a noise effect at a low Signal-to-Noise Ratio (SNR).

6. The method of claim 5, wherein the correlation matrix has a structure of $$R_{hh,4} = \begin{bmatrix} \rho_0 & \rho_1 & \rho_2 & \rho_3 \\ \rho_1^* & \rho_0 & \rho_1 & \rho_2 \\ \rho_2^* & \rho_1^* & \rho_0 & \rho_1 \\ \rho_3^* & \rho_2^* & \rho_1^* & \rho_0 \end{bmatrix}.$$

7. An apparatus for performing channel estimation in an Orthogonal Frequency Division Multiplexing (OFDM) wireless communication system, the apparatus comprising:
   a Least Square (LS) channel estimator for performing primary channel estimation by zero-forcing a training sequence received at each of a plurality of predetermined subcarriers;
   a correlation matrix estimator for grouping the subcarriers into a predetermined number of subgroups, and estimating a correlation matrix corresponding to each subgroup based on a channel estimate acquired for each of the subcarriers by the primary channel estimation;
   a filter calculator for calculating a linear filter coefficient based on the estimated correlation matrix and a previously known noise variance; and
   a Minimum Mean-Square Error (MMSE) channel estimator for performing secondary channel estimation on each of the subcarriers by performing on each of the subgroup an MMSE algorithm to which the calculated linear filter coefficient is applied,
   wherein the linear filter coefficient acquired for each of the subgroups is calculated by using eigen-decomposition of a correlation matrix of a channel h in a corresponding subgroup.

8. The apparatus of claim 7, wherein the correlation matrix estimator estimates a plurality of correlation coefficients depending on the channel estimate acquired for each of the subcarriers by the primary channel estimation, and acquires a correlation matrix determined by considering a number of subcarriers constituting the subgroup depending on a plurality of the estimated correlation coefficients.

9. The apparatus of claim 8, wherein the correlation coefficients are estimated by $\rho_0 = \text{average}[h_n^{LS} h_n^{LS*}] - N_0$ and $\rho_m = \text{average}[h_n^{LS} h_{k+m}^{LS*}]$, where $h_n^{LS} (0 \leq n \leq N-1)$ denotes a channel estimate acquired for each subcarrier, N denotes a number of subcarriers used for transmitting a training sequence, and $N_0$ denotes a noise variance.

10. The apparatus of claim 9, wherein an average for estimation of the correlation coefficients is calculated over subcarriers, reception antennas and packets to reduce a noise effect at a low Signal-to-Noise Ratio (SNR).

11. The apparatus of claim 10, wherein the correlation matrix has a structure of $$R_{hh,4} = \begin{bmatrix} \rho_0 & \rho_1 & \rho_2 & \rho_3 \\ \rho_1^* & \rho_0 & \rho_1 & \rho_2 \\ \rho_2^* & \rho_1^* & \rho_0 & \rho_1 \\ \rho_3^* & \rho_2^* & \rho_1^* & \rho_0 \end{bmatrix}.$$

12. The apparatus of claim 11, wherein the filter calculator calculates the linear filter coefficient $K_S$ by $N_0^{-1}I_S - N_0^{-2}U(N_0^{-1}I+S^{-1})^{-1}U^*$, where $R_{hh,S}=USU^*$ denotes the eigendecomposition of $R_{hh,S}$, and $R_{hh,S}$ denotes the correlation matrix of the channel h in a size-S subgroup, $N_0$ denotes a noise variance, and I and $I_S$ denote identity matrixes.

\* \* \* \* \*